United States Patent
Chen et al.

(10) Patent No.: US 11,112,680 B2
(45) Date of Patent: Sep. 7, 2021

(54) CAMERA AND LIGHT ADJUSTMENT MODULE

(71) Applicant: Chicony Electronics Co., Ltd., New Taipei (TW)

(72) Inventors: Chien-Yueh Chen, New Taipei (TW); Jin-Kae Jang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/929,876

(22) Filed: Jul. 15, 2020

(65) Prior Publication Data

US 2020/0355987 A1 Nov. 12, 2020

Related U.S. Application Data

(63) Continuation-in-part of application No. 16/595,693, filed on Oct. 8, 2019.

(30) Foreign Application Priority Data

May 8, 2019 (TW) .................................. 108115958
Jan. 22, 2020 (TW) .................................. 109102553

(51) Int. Cl.
*G03B 15/05* (2021.01)

(52) U.S. Cl.
CPC ...... *G03B 15/05* (2013.01); *G03B 2215/0503* (2013.01); *G03B 2215/0575* (2013.01)

(58) Field of Classification Search
CPC ............ G03B 15/05; G03B 2215/0503; G03B 2215/0567; G03B 2215/0575; G03B 2215/0585
See application file for complete search history.

(56) References Cited

U.S. PATENT DOCUMENTS 7,712,906 B1 * 5/2010 Larimer ................. G03B 15/05
362/16
9,664,838 B2 * 5/2017 Kinoshita ............ G02B 6/0055
(Continued)

FOREIGN PATENT DOCUMENTS

CN 102798002 A 11/2012
CN 106707660 A 5/2017
(Continued)

*Primary Examiner* — Amy R Hsu
(74) *Attorney, Agent, or Firm* — Muncy, Geissler, Olds & Lowe, P.C

(57) ABSTRACT

A light-adjustment module for camera includes a light source unit and a light-adjustment unit. The light source unit includes light-emitting elements disposed around a lens of the camera, and the light-emitting direction of each light-emitting element is parallel to the image-capturing direction of the lens. The light-adjustment unit is disposed above the light source unit and includes secondary optical elements respectively corresponding to the light-emitting elements. Each secondary optical element includes a light-transmitting cover, and each light-emitting element is accommodated inside the corresponding light-transmitting cover. An inner wall of each light-transmitting cover includes a first light-guiding inclined surface and a second light-guiding inclined surface. A first slope of the first light-guiding inclined surface is different from a second slope of the second light-guiding inclined surface. A light emitted by each light-emitting element is deflected through the corresponding first light-guiding inclined surface and the corresponding second light-guiding inclined surface.

18 Claims, 7 Drawing Sheets

(56) References Cited

U.S. PATENT DOCUMENTS

| | | | | |
|---|---|---|---|---|
| 2006/0083508 A1* | 4/2006 | Tenmyo | ............... | G02B 6/0001 396/199 |
| 2015/0070493 A1* | 3/2015 | Chan | ................... | H04N 5/2256 348/143 |
| 2019/0227330 A1* | 7/2019 | Hu | ...................... | G02B 13/009 |

FOREIGN PATENT DOCUMENTS

| | | |
|---|---|---|
| CN | 107918459 A | 4/2018 |
| CN | 108124040 A | 6/2018 |
| CN | 208399869 U | 1/2019 |
| TW | M586019 U | 11/2019 |

* cited by examiner

CAMERA AND LIGHT ADJUSTMENT MODULE

CROSS-REFERENCE TO RELATED APPLICATION

This application is a continuation-in-part (CIP) of application Ser. No. 16/595,693, filed on Oct. 8, 2019 with claiming foreign priority of TW 108115958. The prior application is herewith incorporated by reference in its entirety.

This non-provisional application claims priority under 35 U.S.C. § 119(a) to Patent Application No. 109102553 in Taiwan, R.O.C. on Jan. 22, 2020, the entire contents of which are hereby incorporated by reference.

BACKGROUND

Technical Field

The instant disclosure relates to an electronic device, in particular, to a camera and a light adjustment module for camera.

Related Art

Cameras are utilized along with auxiliary light sources for auxiliary illumination purpose. Hence, when cameras are utilized to capture images, clear images can be obtained by the aids from the illumination of the auxiliary light sources. Moreover, the auxiliary light source provides a sufficient brightness for capturing images at nighttime or insufficient light circumstances.

To allow the auxiliary light source to emit to a certain region or in a certain angle, the light source of the camera known to the inventor is provided with an insertion-type light emitting element having a pin structure (for instance, a DIP LED). During the manufacturing process of the camera, the pin structure of the insertion-type light emitting element is inserted to a circuit board, and then the pin structure is bent and fixed by soldering. Consequently, the insertion-type light emitting element can be oriented to a certain direction so as to emit to a certain region.

SUMMARY

However, the aforementioned procedure is time consuming and complicated (for instance, the bending step is required to be performed to every light emitting element). Furthermore, because the orientation alignment of the light emitting element is achieved by the bending step, the bending step may be performed mistakably to produce defected products, and the defected products may fail to perform the expected illumination performance. Moreover, the light emitted by the insertion-type light emitting element may have a non-uniform illumination; for instance, the light distant from the insertion-type light emitting element may be diffused to provide a poor illumination. As a result, the image quality of the image may be adversely affected.

In view of this, in one embodiment, a light adjustment module for camera is provided, and the light adjustment module is applicable to a camera. The light adjustment module comprises a light source unit and a light adjustment unit. The light source unit comprises a plurality of light emitting elements. The light emitting elements are disposed around a lens of the camera, and a light emitting direction of each of the light emitting elements is parallel to an image capturing direction of the lens. The light adjustment unit is disposed above the light source unit and comprises a plurality of secondary optical elements. The secondary optical elements respectively correspond to the light emitting elements. Each of the secondary optical elements comprises a light transmitting cover, and each of the light emitting elements is accommodated inside the corresponding light transmitting cover. An inner wall of each of the light transmitting cover comprises a first light guiding inclined surface and a second light guiding inclined surface. A first slope of the first light guiding inclined surface is different from a second slope of the second light guiding inclined surface. A light emitted by each of the light emitting elements is deflected through the corresponding first light guiding inclined surface and the corresponding second light guiding inclined surface.

In one embodiment, a camera is provided. The camera comprises a camera body and the foregoing light adjustment module. The camera body has a lens, and the light adjustment module is disposed in the camera body.

Based on the above, according to one or some embodiments of the instant disclosure, each of the secondary optical elements of the light adjustment unit corresponds to the corresponding light emitting element, and the light emitted by each of the light emitting elements is deflected through the first light guiding inclined surface and the second light guiding inclined surface of the corresponding secondary optical element. Hence, the light adjustment unit guides the light emitted by each light emitting element to achieve an expected illumination angle and intensity distribution, thereby optimizing the uniformness of the illumination to enhance the image quality of the captured image. Moreover, additional manufacturing processes (e.g., the pin-bending and turning procedure) for each light emitting element are not necessarily required, thereby greatly reducing labor and time cost.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
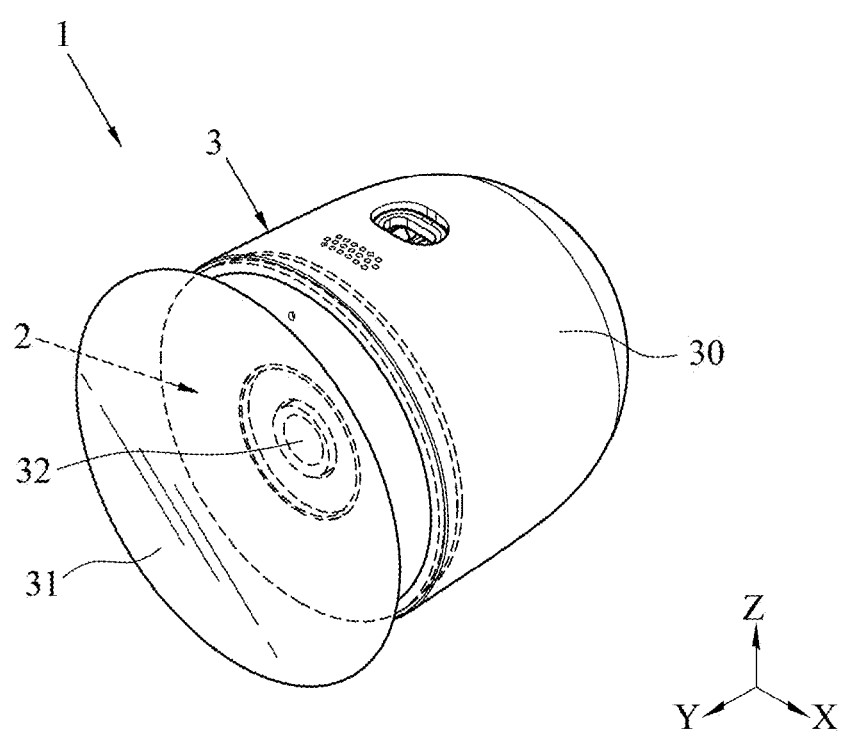
FIG. 1 illustrates a perspective view of a camera according to an exemplary embodiment of the instant disclosure.
Figure 2:
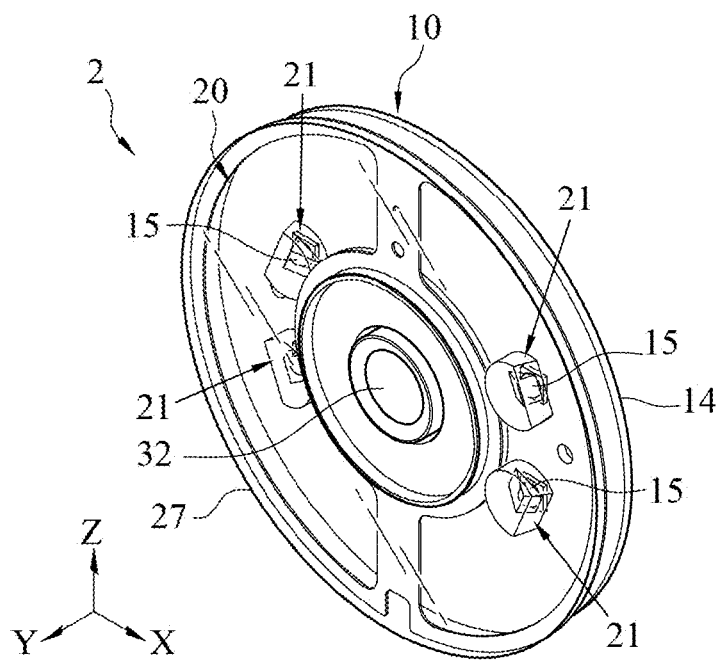
FIG. 2 illustrates a perspective view of a light adjustment module according to a first embodiment of the instant disclosure.
Figure 3:
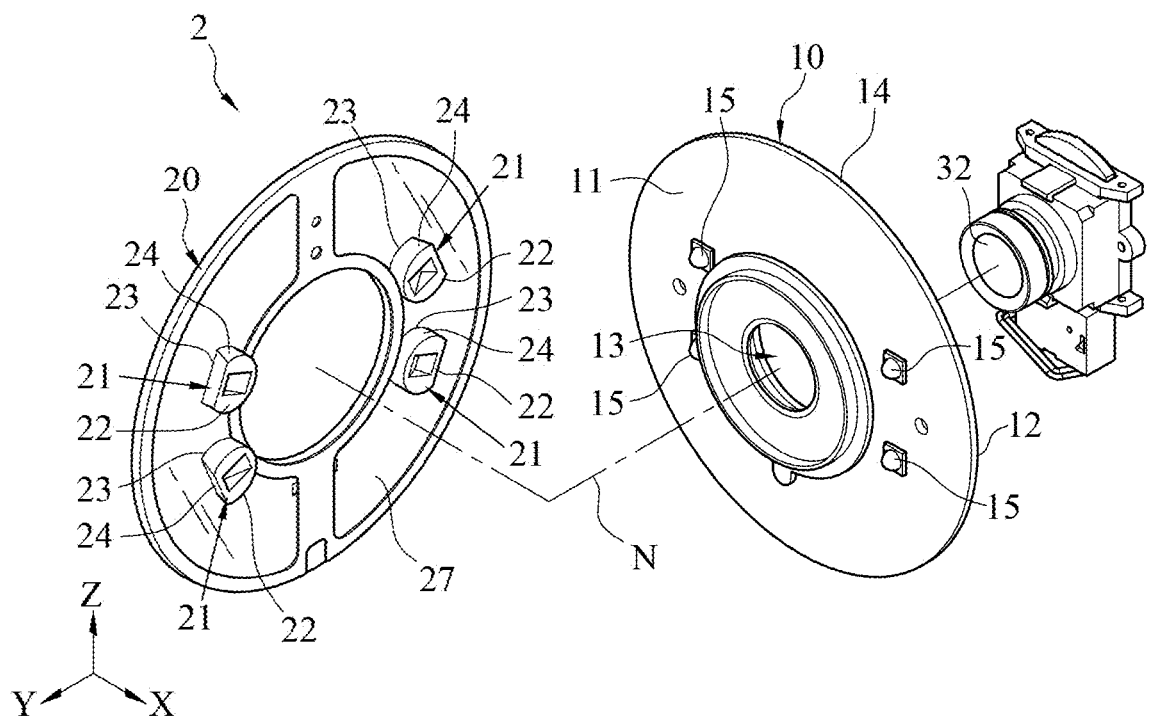
FIG. 3 illustrates an exploded view of the light adjustment module of the first embodiment.
Figure 4:
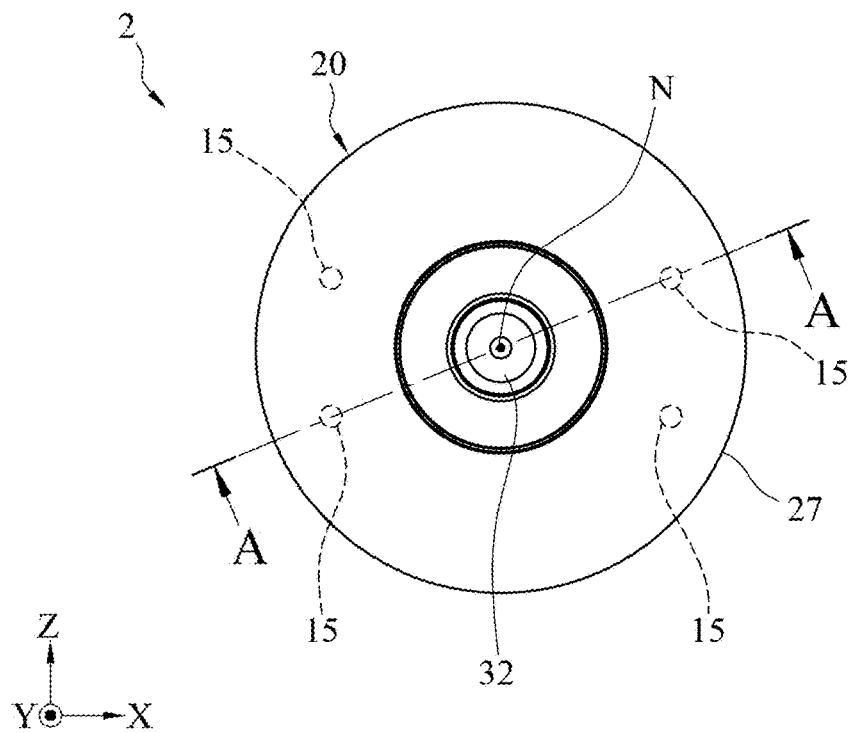
FIG. 4 illustrates a side view of the light adjustment module of the first embodiment.

FIG. 1 illustrates a perspective view of a camera according to an exemplary embodiment of the instant disclosure. FIGS. 2 to 4 illustrate a perspective view, an exploded view, and a side view of a light adjustment module according to a first embodiment of the instant disclosure. As shown in FIG. 1, in this embodiment, a camera 1 is provided and the camera 1 comprises a light adjustment module 2 and a camera body 3. In some embodiments, the camera 1 may be an IP camera or network camera, a closed-circuit television (CCTV), an analog monitor camera, etc. The camera 1 may be installed on different fields (e.g., nursery schools, offices, stores, roads, etc.), so that the personnel safety at the field can be monitored or the personnel activities at the field can be recorded.

As shown in FIGS. 1 to 4, the camera body 3 has a housing 30 and a lens 32. The housing 30 is hollowed and has an image capturing opening 31, the lens 32 is in the housing 30 and faces the image capturing opening 31. Lights outside the housing 30 can enter into the housing 30 through the image capturing opening 31, so that the lens 32 can capture images of the outside of the housing 30. The light adjustment module 2 is assembled on the housing 30 and comprises a light source unit 10 and a light adjustment unit 20. The light source unit 10 comprises a substrate 14 and a plurality of light emitting elements 15 disposed around the lens 32. The substrate 14 comprises a first surface 11 and a second surface 12 opposite to the first surface 11. In this embodiment, the substrate 14 is a printed circuit board, and each light emitting element 15 is a light emitting diode (LED). Moreover, in this embodiment, each light emitting element 15 is fixedly disposed on the first surface 11 using surface mount technology (SMT). A normal direction of the first surface 11 of the substrate 14 is parallel to an image capturing direction of the lens 32 (for instance, the Y axis direction shown in FIG. 3), such that the light emitting direction of each light emitting element 15 is parallel to the image capturing direction of the lens 32. It is understood that, for each light emitting element 15, the light emitting direction is the maximum luminous intensity direction. In this embodiment, the number of the light emitting elements 15 is four, but embodiments are not limited thereto; according to different needs, the number of the light emitting elements 15 can be altered.

As shown in FIG. 3, the substrate 14 has a lens mount portion 13 for assembling the lens 32. In this embodiment, the lens mount portion 13 is a central through hole, such that the lens 32 is inserted into the lens mount portion 13, but embodiments are not limited thereto. Hence, the lens 32 can be prevented from being shielded and capable of capturing images of the outside of the housing 30. In some embodiments, the lens mount portion 13 of the substrate 14 may be a solid portion, so that the lens 32 can be assembled with the lens mount portion 13 directly and face toward the image capturing opening 31.

As shown in FIGS. 3 and 4, the lens 32 has a normal central axis N (in this embodiment, the axis direction of the normal central axis N is parallel to the Y axis direction shown in FIGS. 1 to 3). The image capturing direction of the lens 32 is the axis direction of the normal central axis N. The light emitting elements 15 are disposed around the normal central axis N equidistantly. In other words, the shortest distance between each light emitting element 15 and the normal central axis N is the same, but embodiments are not limited thereto. In some embodiments, the positions of the light emitting elements 15 may be arranged differently according to needs. For example, the light emitting elements 15 may be disposed at a same side of the lens mount portion 13, or disposed around the normal central axis N equiangularly (e.g., 30 degrees, 45 degrees, or 60 degrees), or disposed irregularly.

As shown in FIGS. 1 to 4, the light adjustment unit 20 is disposed above the light source unit 10 and comprises a plurality of secondary optical elements 21. The secondary optical elements 21 correspond to the light emitting elements 15. A light emitted by each light emitting element 15 is deflected via the corresponding secondary optical element 21. Accordingly, the light emitted by each light emitting element 15 can be emitted to a certain region of the image capturing region of the camera 1. For example, the light emitted by each light emitting element 15 is emitted to one of the quadrants of the image capturing region of the camera 1. In some embodiments, the light adjustment unit 20 and the light source unit 10 are arranged along the image capturing direction of the lens 32 in a side-by-side manner, and the light adjustment unit 20 is located in front of the light source unit 10. The light adjustment unit 20 further comprises a transparent cover 27 disposed on one side of the first surface 11 of the substrate 14. The secondary optical elements 21 are extending from the surface of the transparent cover 27 and respectively correspond to the light emitting elements 15, so that the secondary optical elements 21 are respectively disposed around the normal central axis N equidistantly. In this embodiment, the transparent cover 27 and the secondary optical elements 21 are a one-piece structure (for example, the transparent cover 27 and the secondary optical elements 21 may be integrally formed with each other by injection molding). The transparent cover 27 covers the light emitting elements 15. The secondary optical elements 21 is located between the substrate 14 and the transparent cover 27, and the secondary optical elements 21 respectively correspond to the light emitting elements 15.

As shown in FIGS. 1 to 4, in this embodiment, each of the secondary optical elements 21 comprises a light transmitting cover 24, and each of the light transmitting covers 24 has a first end 22 and a second end 23 axially opposite to the first end 22. In this embodiment, the axial direction of each of the light transmitting cover 24 and the image capturing direction of the lens 32 (that is, the direction of the normal central axis N) are the same. Moreover, the first end 22 of each of the secondary optical elements 21 is adjacent to the first surface 11, and encloses and covers the corresponding light emitting element 15, so that each of the light emitting elements 15 is accommodated inside the corresponding light transmitting cover 24. The second end 23 of each of the light transmitting cover 24 is distant from the first surface 11 and connected to the surface of the transparent cover 27.

In some embodiments, the transparent cover 27 and each of the light transmitting covers 24 are made of transparent materials. For instance, the transparent materials may be polycarbonate (PC), poly(methyl methacrylate) (PMMA), glass materials, and so on, so that some of the light emitted by each light emitting element 15 can pass the secondary optical elements 21 and the transparent cover 27, and then the light can illuminate outwardly from the image capturing opening 31. Hence, the auxiliary illumination function can be achieved.

In some embodiments, the light adjustment unit 20 can be directly fixed on the substrate 14. For example, each of the secondary optical elements 21 can be fixed on the first surface 11 of the substrate 14 by gluing or engaging. Alternatively, the light adjustment unit 20 may be fixed with the housing 30 of the camera 1 by assembling, embodiments are not limited thereto.

Figure 5:
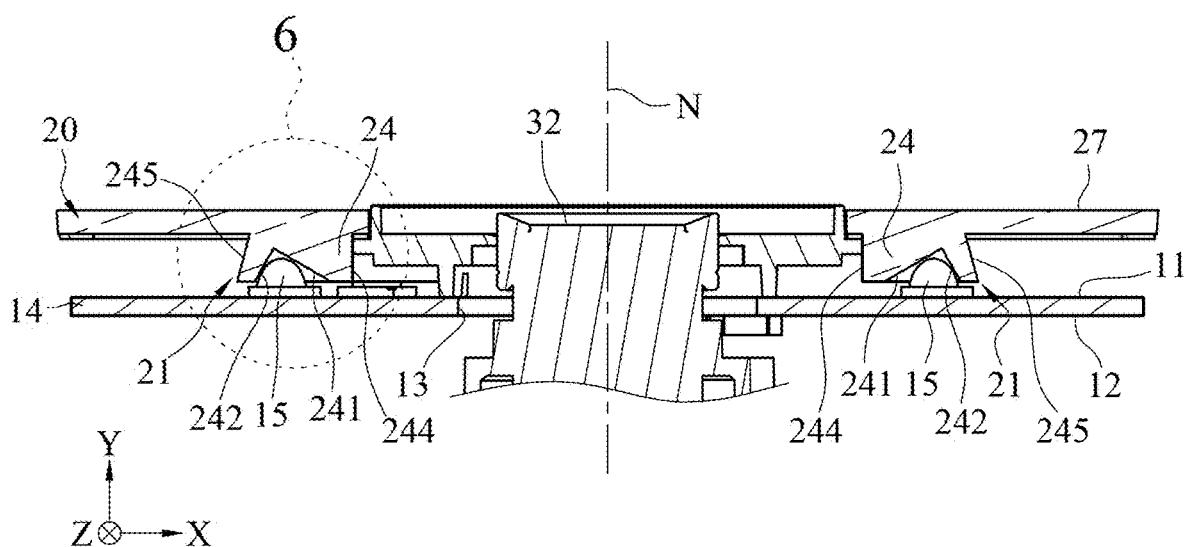
FIG. 5 illustrates a partial cross-sectional view of the light adjustment module of the first embodiment.
Figure 6:
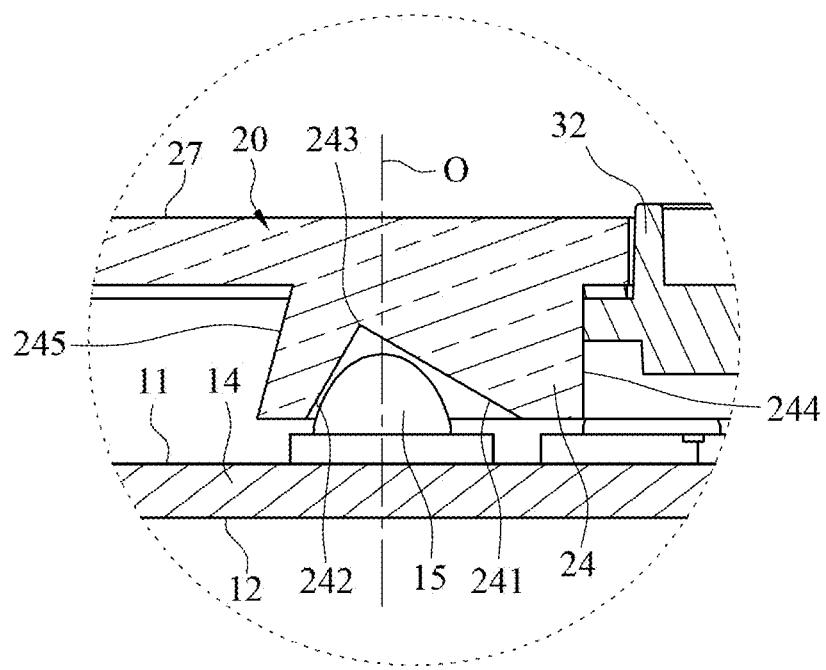
FIG. 6 illustrates an enlarged partial view of FIG. 5.

Please further refer to FIGS. 4 to 6, where FIG. 5 illustrates a partial cross-sectional view along of the light adjustment module of the first embodiment and FIG. 6 illustrates an enlarged partial view of the region 6 shown in FIG. 5. In this embodiment, FIG. 5 is sectioned along the line A-A shown in FIG. 4, where the line A-A is extending in a radial direction perpendicular to the normal central axis N, and two of the light transmitting covers 24 are sectioned by the line A-A. As shown in FIGS. 5 and 6, an inner wall of each of the light transmitting covers 24 comprises a first light guiding inclined surface 241 and a second light guiding inclined surface 242, and a first slope of the first light guiding inclined surface 241 is different from a second slope of the second light guiding inclined surface 242. In other words, the slope of the first light guiding inclined surface 241 may be greater than or less than the slope of the second light guiding inclined surface 242.

As shown in FIGS. 5 and 6, in this embodiment, each of the light transmitting covers 24 comprises an inner side 244 and an outer side 245 opposite to the inner side 244. A distance between the inner side 244 and the normal central axis N is shorter than a distance between the outer side 245 and the normal central axis N; in other words, for each of the light transmitting covers 24, a distance between the first light guiding inclined surface 241 and the normal central axis N is shorter than a distance between the second light guiding inclined surface 242 and the normal central axis N, and a distance between the first light guiding inclined surface 241 and the lens 32 is shorter than a distance between the second light guiding inclined surface 242 and the lens 32. Moreover, in this embodiment, an absolute value of the slope of the first light guiding inclined surface 241 is less than an absolute value of the slope of the second light guiding inclined surface 242, but embodiments are not limited thereto. In some embodiments, the number of the light guiding inclined surface on the inner wall of each of the light transmitting covers 24 may be more than two; for example, the inner wall of each of the light transmitting covers 24 may comprise three light guiding inclined surfaces, and at least two of the three light guiding inclined surfaces have different slopes.

Figure 7:
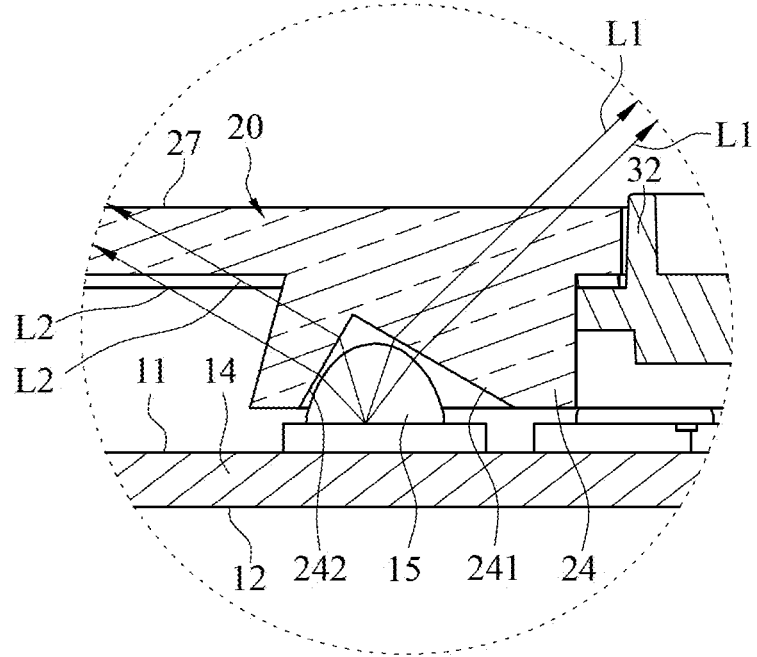
FIG. 7 illustrates an enlarged partial cross-sectional view showing that a light beam is guided by the light adjustment module shown in FIG. 5.

According to one or some embodiments of the instant disclosure, the light transmitting cover 24 of each of the secondary optical elements 21 of the light adjustment unit 20 encloses and covers the outside of the corresponding light emitting element 15, and the first light guiding inclined surface 241 and the second light guiding inclined surface 242 of the inner wall of each of the secondary optical elements 21 have different slopes. Hence, each of the secondary optical elements 21 guides the light emitted by the corresponding light emitting element 15 to achieve an expected illumination angle and intensity distribution. For instance, as shown in FIG. 7, which illustrates an enlarged partial cross-sectional view showing that a light beam is guided by the light adjustment module shown in FIG. 5, in this embodiment, since the slope of the first light guiding inclined surface 241 of each of the light transmitting covers 24 is different from the slope of the second light guiding inclined surface 242 of the corresponding light transmitting cover 24, different refraction effects may be generated after each of the light emitting elements 15 emits light to the first light guiding inclined surface 241 and the second light guiding inclined surface 242. In an example, the slope of the first light guiding inclined surface 241 is designated to allow the light (for example, indicated by the arrow L1 shown in FIG. 7) to be refracted and transmitted in a direction toward the lens 32, and to illuminate a predetermined region and position when the corresponding light emitting element 15 emits light to the first light guiding inclined surface 241. Hence, the light illumination regions of the light emitting elements 15 can be partially overlapped in the image capturing direction of the lens 32, thereby increasing the brightness in the image capturing direction of the lens 32. In addition, the slope of the second light guiding inclined surface 242 is designated to allow the light (for example, indicated by the arrow L2 shown in FIG. 7) to be refracted and transmitted in a direction away from the lens 32, and to illuminate a predetermined region and position when the corresponding light emitting element 15 emits light to the second light guiding inclined surface 242.

Figure 8:
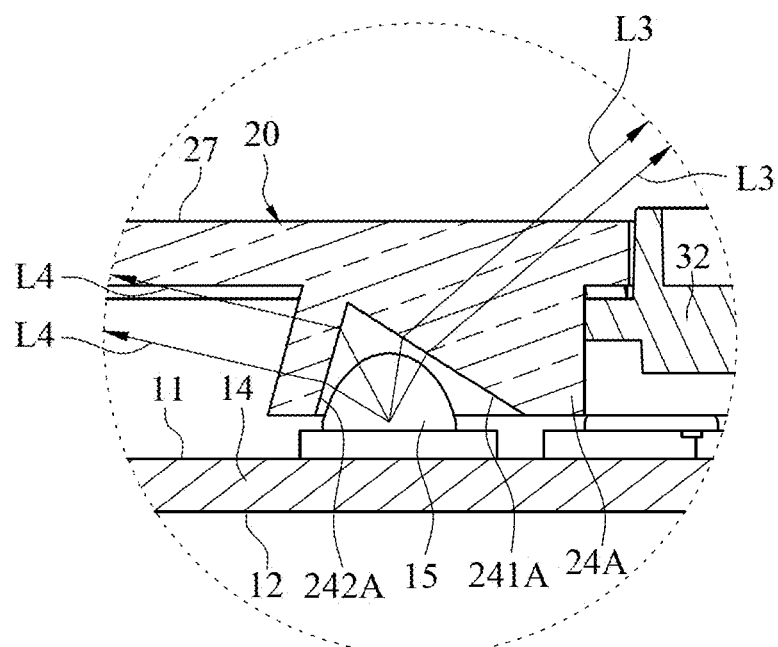
FIG. 8 illustrates an enlarged partial cross-sectional view showing that a light beam is guided by a light adjustment module according to a second embodiment of the instant disclosure.

Please refer to FIGS. 7 and 8, where FIG. 8 illustrates an enlarged partial cross-sectional view showing that a light beam is guided by a light adjustment module according to a second embodiment of the instant disclosure. The second embodiment and the embodiment shown in FIG. 7 at least have following differences. The absolute value of the slope of the first light guiding inclined surface 241A of each of the light transmitting covers 24A shown in this embodiment is greater than the absolute value of the slope of the first light guiding inclined surface 241 of each of the light transmitting covers 24 shown in FIG. 7, and the absolute value of the slope of the second light guiding inclined surface 242A of each of the light transmitting covers 24A shown in this embodiment is greater than the absolute value of the slope of the second light guiding inclined surface 242 of each of the light transmitting covers 24 shown in FIG. 7. Accordingly, when each of the light emitting elements 15 emits light to the first light guiding inclined surface 241A, the region and position illuminated by the refracted light (for example, indicated by the arrow L3 shown in FIG. 8) can be much closer to the image capturing direction of the lens 32, thereby increasing the overlapped portions of the illumination regions of the light emitting elements 15 in the image capturing direction of the lens 32. Hence, the brightness in the image capturing direction of the lens 32 can be improved to prevent from the brightness of the central portion of the captured image being insufficient. Similarly, when each of the light emitting elements 15 emits light to the second light guiding inclined surface 242A, the region and the position illuminated by the refracted light (for example, indicated by the arrow L4 shown in FIG. 8) can be more distant from the image capturing direction of the lens 32. Consequently, the region and position illuminated by each of the light emitting elements 15 can be adjusted according to different needs.

As above, according to one or some embodiments of the instant disclosure, the light emitted by each of the light emitting elements 15 is deflected by the first light guiding inclined surface 241 and the second light guiding inclined surface 242 of the corresponding light transmitting cover 24 to illuminate the predetermined illumination region so as to increase the brightness. Furthermore, the light emitted by each of the light emitting elements 15 can be guided by the corresponding first light guiding inclined surface 241 and the corresponding second light guiding inclined surface 242 to the expected illumination angle and positon, so that the light illuminates the predetermined region of the image capturing region. Accordingly, the brightness in the predetermined illumination region can be uniform, thereby greatly enhancing the image quality of the captured image. For example, the lights emitted by the light emitting elements 15 can be respectively emitted to different quadrants of the predetermined illumination region, and the light emitted by the light emitting elements 15 can be guided by the respective first light guiding inclined surfaces 241 and the respective second light guiding inclined surfaces 242. Hence, parts of the lights emitted by the light emitting elements 15 can be overlapped at the intersection of the quadrants, thereby preventing the intersection of the quadrants from having insufficient illuminations. Hence, the brightness on the predetermined illumination regions can be uniform.

Moreover, according to one or some embodiments of the instant disclosure, the light illumination can be controlled by the light transmitting cover 24 of each of the secondary optical elements 21 enclosing and covering the corresponding light emitting element 15. Hence, additional manufacturing processes (e.g., the pin-bending and turning procedure) for each of the light emitting elements 15 are not necessarily required. As shown in FIGS. 6 and 7, in this embodiment, each of the light emitting elements 15 is a surface-mount technology (SMT) LED, such that each of the light emitting elements 15 can be attached on the first surface 11 of the substrate 14 quickly during the manufacturing, thereby greatly reducing labor and time cost.

In some embodiments, according to one or some embodiments of the instant disclosure, the position of each of the light emitting elements 15 in the corresponding light transmitting cover 24 can be adjusted, so that the illumination angle and the intensity distribution of the light emitted by each of the light emitting elements 15 and coming out of the image capturing opening 31 can be adjusted. As shown in FIG. 6, in this embodiment, each of the light emitting elements 15 is eccentrically disposed in the corresponding light transmitting cover 24. For example, each of the light emitting elements 15 is closer to the second light guiding inclined surface 242 of the corresponding light transmitting cover 24 and relatively farer from the first light guiding inclined surface 241 of the corresponding light transmitting cover 24 to have an eccentric configuration. Therefore, the illumination angle of each of the light emitting elements 15 to the first light guiding inclined surface 241 and the second light guiding inclined surface 242 can be changed to generate different refraction effects, thereby changing the illumination angle and the intensity distribution of the light coming out of the image capturing opening 31. Moreover, in some embodiments, each of the light emitting elements 15 may be closer to the first light guiding inclined surface 241 of the corresponding light transmitting cover 24 and relatively farer from the second light guiding inclined surface 242 of the corresponding light transmitting cover 24.

As shown in FIG. 6, in this embodiment, each of the light transmitting covers 24 comprises a connection portion 243 between the first light guiding inclined surface 241 and the second light guiding inclined surface 242. In other words, in this embodiment, for each of the light transmitting covers 24, one end of the first light guiding inclined surface 241 is connected to one end of the second light guiding inclined surface 242, and the connection portion 243 is located in the light emitting direction of the corresponding light emitting element 15 and is deflected from an optical axis O of the corresponding light emitting element 15, where the optical axis O of each of the light emitting elements 15 is parallel to the normal central axis N of the lens 32. Accordingly, based on one or some embodiments of the instant disclosure, the position of each of the connection portions 243 relative to the corresponding light emitting element 15 can be changed to change the illumination angle of each of the light emitting 15 on the corresponding first light guiding inclined surface 241 and the corresponding second light guiding inclined surface 242 so as to have different refraction effects, thereby changing the illumination angle and the intensity distribution of the light coming out of the image capturing opening 31. In some embodiments, the connection portion 243 between the first light guiding inclined surface 241 and the second light guiding inclined surface 242 of each of the light transmitting covers 24 may be at the optical axis O of the corresponding light emitting element 15.

Figure 9:
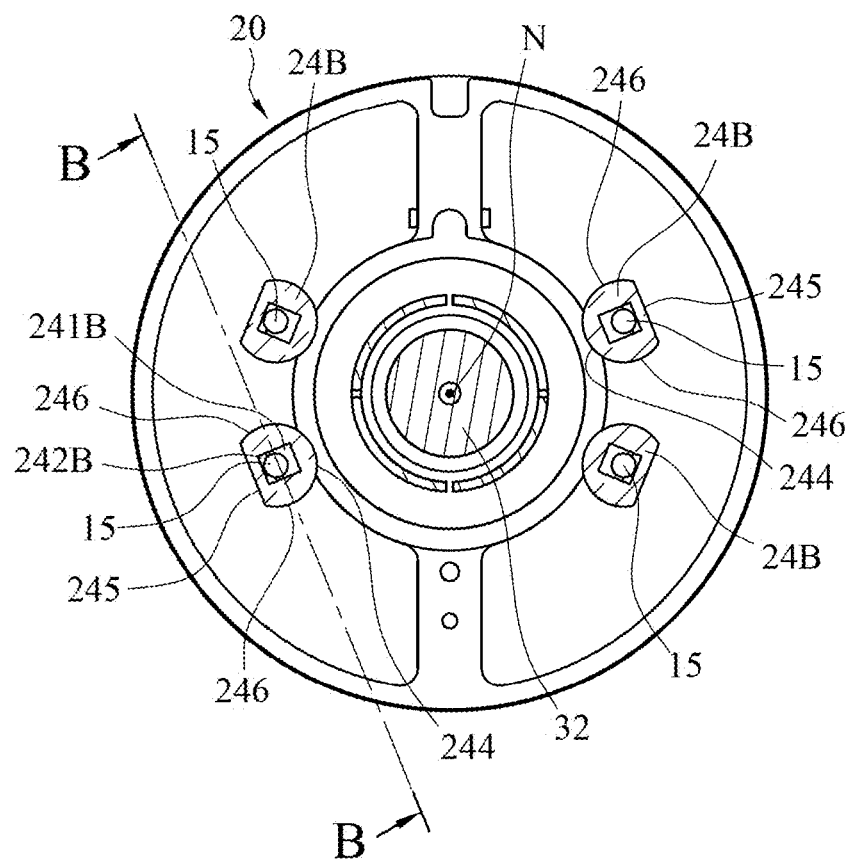
FIG. 9 illustrates a side view of a light adjustment module according to a third embodiment of the instant disclosure.
Figure 10:
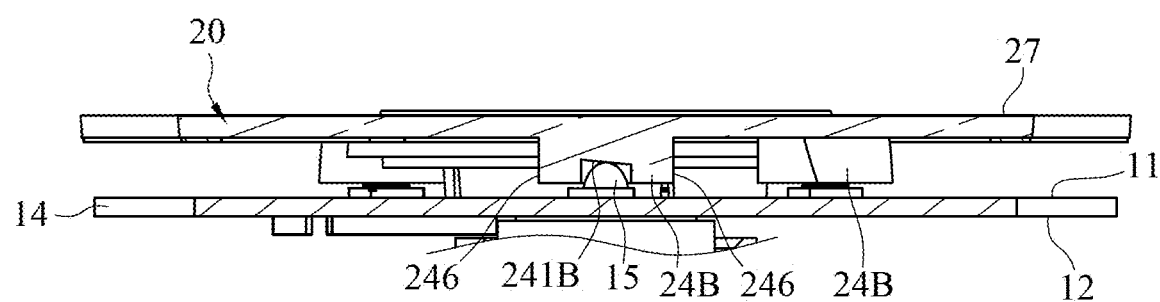
FIG. 10 illustrates a partial cross-sectional view of FIG. 9.

In some embodiments, one or both of the first light guiding inclined surface 241 and the second light guiding inclined surface 242 of each of the light transmitting covers 24 may be inclined toward other directions, so that the light emitted by the corresponding light emitting element 15 can be refracted to generate different refraction effects. As shown in FIGS. 9 and 10, where FIG. 9 illustrates a side view of a light adjustment module according to a third embodiment of the instant disclosure and FIG. 10 illustrates a partial cross-sectional view of FIG. 9. In this embodiment, FIG. 10 is sectioned along the line B-B shown in FIG. 9, where the line B-B is extending in a horizontal direction perpendicular to the normal central axis N and the line A-A shown in FIG. 4, and one of the light transmitting covers 24B is sectioned by the line B-B. As shown in FIGS. 9 and 10, each of the light transmitting covers 24B comprises two lateral portions 246 opposite to each other, and the two lateral portions 246 are connected between the inner side 244 and the outer side 245. In this embodiment, the first light guiding inclined surface 241B of each of the light transmitting covers 24 inclines toward one of the lateral portions 246 (namely, toward the horizontal direction). Hence, as compared with the embodiments shown in FIGS. 1 to 6, in this embodiment, after the light emitted by each of the light emitting elements 15 is refracted by the corresponding first light guiding inclined surface 241B, the refracted light can be transmitted to a different direction to illuminate a different region and position. In some embodiments, the second light guiding inclined surface 242B of each of the light transmitting covers 24 inclines toward one of the lateral portions 246 (namely, toward the horizontal direction), and detail descriptions for the embodiments are omitted.

Figure 11:
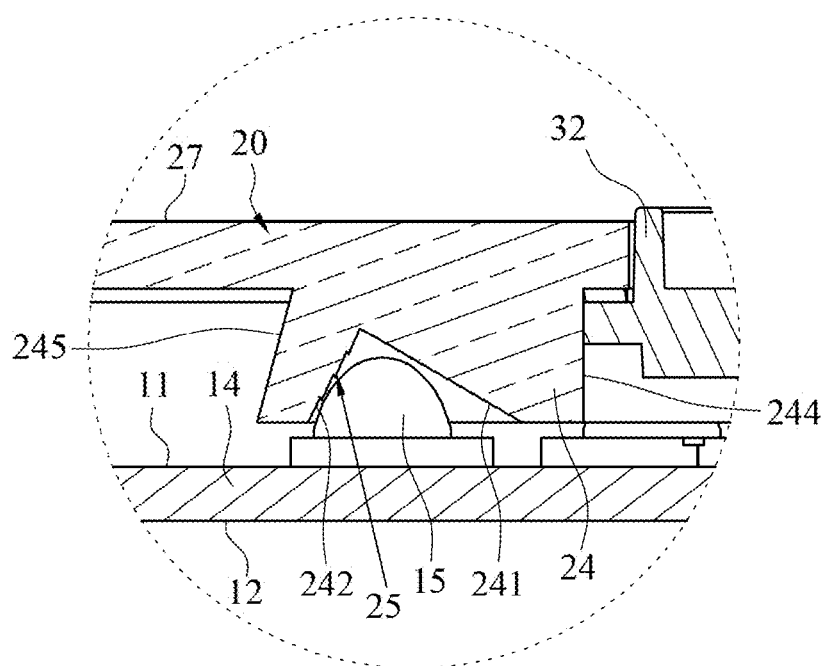
FIG. 11 illustrates a partial cross-sectional view of a light adjustment module according to a fourth embodiment of the instant disclosure.

In some embodiments, in each of the light transmitting covers 24, one or both of the surface of the first light guiding inclined surface 241 and the surface of the second light guiding inclined surface 242 further comprises an optical microstructure 25. In other words, in each of the light transmitting covers 24, a surface of the first light guiding inclined surface 241, a surface of the second light guiding inclined surface 242, or both the surface of the first light guiding inclined surface 241 and the surface of the second light guiding inclined surface 242 comprise the optical microstructure 25. For example, as shown in FIG. 11, a partial cross-sectional view of a light adjustment module according to a fourth embodiment of the instant disclosure is illustrated. The fourth embodiment and the embodiment shown in FIGS. 1 to 6 at least have following differences. In this embodiment, the second light guiding inclined surface 242 of each of the light transmitting covers 24 further comprises an optical microstructure 25 in a zigzag profile so as to increase the light guiding area of the second light guiding inclined surface 242. Accordingly, the light adjustment module 2 can be designed to be much thinner without affecting the light guiding performance of the second light guiding inclined surface 242. Similarly, in some embodiments, the first light guiding inclined surface 241 may comprise the optical microstructure 25, and detail descriptions for the embodiments are omitted.

In some embodiments, the optical microstructure 25 may be a light guiding membrane, a light diffusion membrane, or light guiding dots, embodiments are not limited thereto.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A light adjustment module for camera is applicable to a camera, the light adjustment module comprising:
   a light source unit comprising a plurality of light emitting elements disposed around a lens of the camera, wherein a light emitting direction of each of the light emitting elements is parallel to an image capturing direction of the lens; and
   a light adjustment unit disposed above the light source unit and comprising a plurality of secondary optical elements, wherein the secondary optical elements respectively corresponds to of light emitting elements;
   wherein each of the secondary optical elements comprises a light transmitting cover, each of the light emitting elements is accommodated inside the corresponding light transmitting cover; an inner wall of each of the light transmitting covers comprises a first light guiding inclined surface and a second light guiding inclined surface, and a first slope of the first light guiding inclined surface is different from a second slope of the second light guiding inclined surface; wherein a light emitted by each of the light emitting elements is deflected through the corresponding first light guiding inclined surface and the corresponding second light guiding inclined surface.

2. The light adjustment module for camera according to claim 1, wherein the lens comprises a normal central axis, each of the light transmitting covers comprises an inner side and an outer side opposite to the inner side, a distance between the inner side and the normal central axis is shorter than a distance between the outer side and the normal central axis, and for each of the light transmitting covers, a distance between the first light guiding inclined surface and the inner side is shorter than a distance between the second light guiding inclined surface and the inner side.

3. The light adjustment module for camera according to claim 2, wherein in each of the light transmitting covers, an absolute value of the first slope of the first light guiding inclined surface is less than an absolute value of the second slope of the second light guiding inclined surface.

4. The light adjustment module for camera according to claim 1, wherein each of the light transmitting covers comprises a lateral portion connected between the inner side and the outer side, and the first light guiding inclined surface or the second light guiding inclined surface inclines toward the lateral portion.

5. The light adjustment module for camera according to claim 1, wherein each of the light transmitting covers comprises a connection portion between the first light guiding inclined surface and the second light guiding inclined surface, and the connection portion of each of the light transmitting covers is located in the light emitting direction of the corresponding light emitting element and is deflected from an optical axis of the corresponding light emitting element.

6. The light adjustment module for camera according to claim 1, wherein in each of the light transmitting covers, a surface of the first light guiding inclined surface, a surface of the second light guiding inclined surface, or both the surface of the first light guiding inclined surface and the surface of the second guiding inclined surface comprise an optical microstructure.

7. The light adjustment module for camera according to claim 1, wherein the light source unit comprises a substrate, the substrate comprises a first surface and a second surface opposite to the first surface, and the light emitting elements are fixedly disposed on the first surface.

8. The light adjustment module for camera according to claim 1, wherein the light adjustment unit comprises a transparent cover, and the secondary optical elements are extending from a surface of the transparent cover.

9. The light adjustment module for camera according to claim 1, wherein each of the light emitting elements is eccentrically disposed in the corresponding light transmitting cover.

10. A camera comprising:
    a camera body having a lens; and
    a light adjustment module for camera according to claim 1, wherein the light adjustment module is disposed in the camera body.

11. The camera according to claim 10, wherein the lens comprises a normal central axis, each of the light transmitting covers comprises an inner side and an outer side opposite to the inner side, a distance between the inner side and the normal central axis is shorter than a distance between the outer side and the normal central axis, and for each of the light transmitting covers, a distance between the first light guiding inclined surface and the inner side is shorter than a distance between the second light guiding inclined surface and the inner side.

12. The camera according to claim 11, wherein in each of the light transmitting covers, an absolute value of the first slope of the first light guiding inclined surface is less than an absolute value of the second slope of the second light guiding inclined surface.

13. The camera according to claim 10, wherein each of the light transmitting covers comprises a lateral portion connected between the inner side and the outer side, and the first light guiding inclined surface or the second light guiding inclined surface inclines toward the lateral portion.

14. The camera according to claim 10, wherein each of the light transmitting covers comprises a connection portion between the first light guiding inclined surface and the second light guiding inclined surface, and the connection portion of each of the light transmitting covers is located in the light emitting direction of the corresponding light emitting element and is deflected from an optical axis of the corresponding light emitting element.

15. The camera according to claim 10, wherein in each of the light transmitting covers, a surface of the first light guiding inclined surface, a surface of the second light guiding inclined surface, or both the surface of the first light guiding inclined surface and the surface of the second guiding inclined surface comprise an optical microstructure.

16. The camera according to claim 10, wherein the light source unit comprises a substrate, the substrate comprises a first surface and a second surface opposite to the first surface, and the light emitting elements are fixedly disposed on the first surface.

17. The camera according to claim 10, wherein the light adjustment unit comprises a transparent cover, and the secondary optical elements are extending from a surface of the transparent cover.

18. The camera according to claim 10, wherein each of the light emitting elements is eccentrically disposed in the corresponding light transmitting cover.

* * * * *